US009102481B2

(12) United States Patent
Moore et al.

(10) Patent No.: US 9,102,481 B2
(45) Date of Patent: Aug. 11, 2015

(54) FLEXIBLE PRODUCTION COLLATING SYSTEM

(75) Inventors: Kenneth P. Moore, Rochester, NY (US);
Douglas K. Herrmann, Webster, NY (US); Derek A. Bryl, Webster, NY (US);
Paul N. Richards, Fairport, NY (US);
Richard Scarlata, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 959 days.

(21) Appl. No.: 13/206,556

(22) Filed: Aug. 10, 2011

(65) Prior Publication Data

US 2013/0036887 A1 Feb. 14, 2013

(51) Int. Cl.
*B65G 57/04* (2006.01)
*B26D 7/32* (2006.01)
*B65G 47/84* (2006.01)
*B65H 29/24* (2006.01)

(52) U.S. Cl.
CPC *B65G 57/04* (2013.01); *B26D 7/32* (2013.01); *B65G 47/843* (2013.01); *B65H 29/241* (2013.01); *B65H 2406/344* (2013.01); *B65H 2511/40* (2013.01); *B65H 2513/40* (2013.01); *Y10T 83/207* (2015.04); *Y10T 83/2192* (2015.04)

(58) Field of Classification Search
CPC .......... B26D 5/00; B26D 5/005; B65G 15/00; B65G 15/02; B65G 15/04; B65G 15/08; B65G 15/58; B65B 57/00; B65B 57/03; B65B 57/035; B65B 57/04
USPC ........... 83/98, 100, 109, 150, 155; 198/470.1, 198/471.1, 469.1, 803.5, 803.3, 803.11, 198/867.01–867.03, 867.08, 867.15, 198/377.03, 377.04, 377.07, 377.08, 428
See application file for complete search history.

(56) References Cited

U.S. PATENT DOCUMENTS

| 3,682,469 | A | * | 8/1972 | Itoh et al. ..................... 271/12 |
| 3,757,926 | A | * | 9/1973 | Gendron et al. ......... 198/370.12 |
| 3,908,835 | A | * | 9/1975 | Lubas ..................... 414/793.1 |
| 3,966,318 | A | | 6/1976 | Amort |
| 4,050,574 | A | * | 9/1977 | Chenevard et al. ........... 198/458 |
| 4,784,254 | A | * | 11/1988 | Schraft et al. ................ 198/434 |
| 4,910,864 | A | | 3/1990 | Elliott |
| 4,921,237 | A | | 5/1990 | Nubson et al. |
| 5,632,590 | A | | 5/1997 | Pearson et al. |
| 5,653,671 | A | | 8/1997 | Reuteler |
| 5,680,746 | A | | 10/1997 | Hornisch |
| 5,803,447 | A | | 9/1998 | Singer et al. |
| 5,819,954 | A | | 10/1998 | Lacriola |
| 5,924,840 | A | | 7/1999 | Charron et al. |
| 6,032,004 | A | | 2/2000 | Mirabella, Jr. et al. |

* cited by examiner

*Primary Examiner* — Phong Nguyen
(74) *Attorney, Agent, or Firm* — Gibb & Riley, LLC (57) ABSTRACT

In a system, at least two picker support elements are positioned adjacent a transport surface that is moving workpieces, and at least two picking elements are connected to each of the picker support elements. The picking elements have physical picking features that remove the workpieces from the transport surface and move the workpieces to another location. A controller is operatively connected to the picker support elements and the picking elements, and the controller independently controls the picker support elements and the picking elements to dynamically position the picking elements in coordination with a dynamic size, spacing, and transport speed of the workpieces being moved by the transport surface.

19 Claims, 6 Drawing Sheets

FLEXIBLE PRODUCTION COLLATING SYSTEM

BACKGROUND

Embodiments herein generally relate to manufacturing transport systems, and more particularly to systems that use a controller to independently control picker support elements and picking elements to dynamically position the picking elements in coordination with the dynamic size, spacing, and transport speed of workpieces being moved by a transport surface.

High-speed digital printing systems exist that offer the ability to print, cut, and package custom signage. This is accomplished through tandem or individual printers, a programmable laser sign cutter, a stacking system, and shrink-wrap packaging line. Since only the sign printing and cutting methods are completely flexible, the collating/stacking system remains as the limiting factor in having a fully flexible system (since it is limited to only compiling signs of a certain size and shape). Major redesign of the collating/stacking system would be required in order to efficiently handle anything other than the current fixed-size options. There is now demand for a more flexible system to enable a wide variety of quick turnaround, variable data signage with a much broader range of size and shape.

SUMMARY

Various exemplary systems herein comprise a production machine (such as a laser cutter) producing the workpieces (such as printed signs). The production machine is operatively connected to a controller and provides the controller with dynamic size, spacing, and transport speed of the workpieces on a transport belt (sometimes called a "transport surface" herein). At least two items that are sometimes referred to herein as "picker support elements" are positioned adjacent the transport surface that is moving the workpieces, and at least two picking elements (e.g., suction devices) are connected to each of the picker support elements.

In some embodiments, the picker support elements are independently movable bars each having multiple picking elements. In this embodiment, a plurality of independently controllable belts are connected to the bars, and the belts are controlled by the controller to move the bars.

The picking elements have physical picking features that remove the workpieces from the transport surface and move the workpieces to another location (e.g., to a stacking area). A controller is operatively connected to the picker support elements and the picking elements, and the controller independently controls the picker support elements and the picking elements to dynamically position the picking elements in coordination with the dynamic size, spacing, and transport speed of the workpieces being moved by the transport surface.

In the embodiments herein, the controller independently and automatically controls movement of the belts and actuation of the picking elements to dynamically position and actuate the picking elements in coordination with each different job-specific pattern of the workpieces output to the transport surface.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
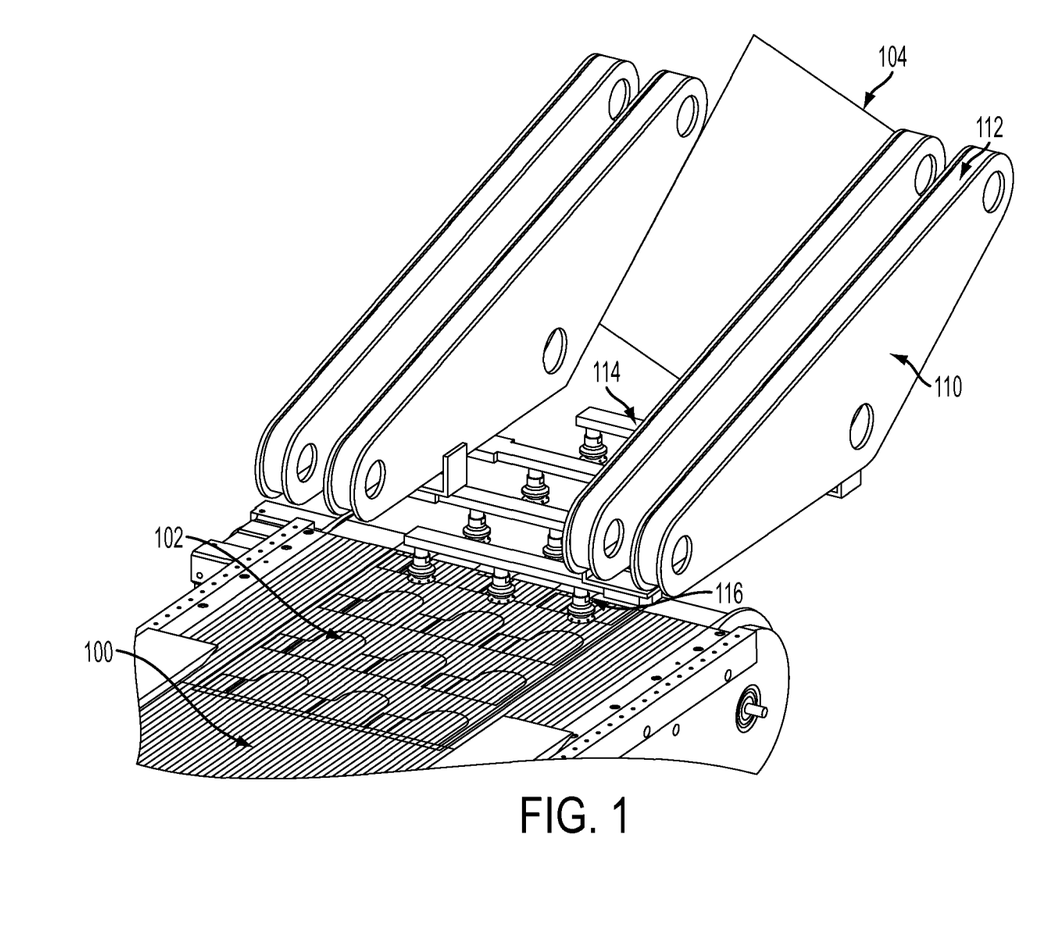
FIG. 1 is a perspective-view schematic diagram of a device according to embodiments herein.

The following embodiments provide flexible sign "picking and stacking" systems. In the examples presented below, this system is positioned at the end of a belt 100 (also referred to sometimes as a transport surface) of a manufacturing device, such as a laser sign cutting machine (FIG. 1). However, one ordinarily skilled in the art would understand that the systems herein are not limited to any specific machine, and the systems herein can be positioned next to and used with any manufacturing machine that produces workpieces.

One exemplary system herein (shown in perspective view in FIGS. 1 and 3, and side view in FIGS. 2 and 4) can include, for example, two or more belts 112 on a tracking system 110, each carrying one or more suction "picker" bars 114 which align with the workpieces 102 (e.g., printed signs) to acquire them from the laser belt (transport surface) 100 immediately after they are cut.

Figure 3:
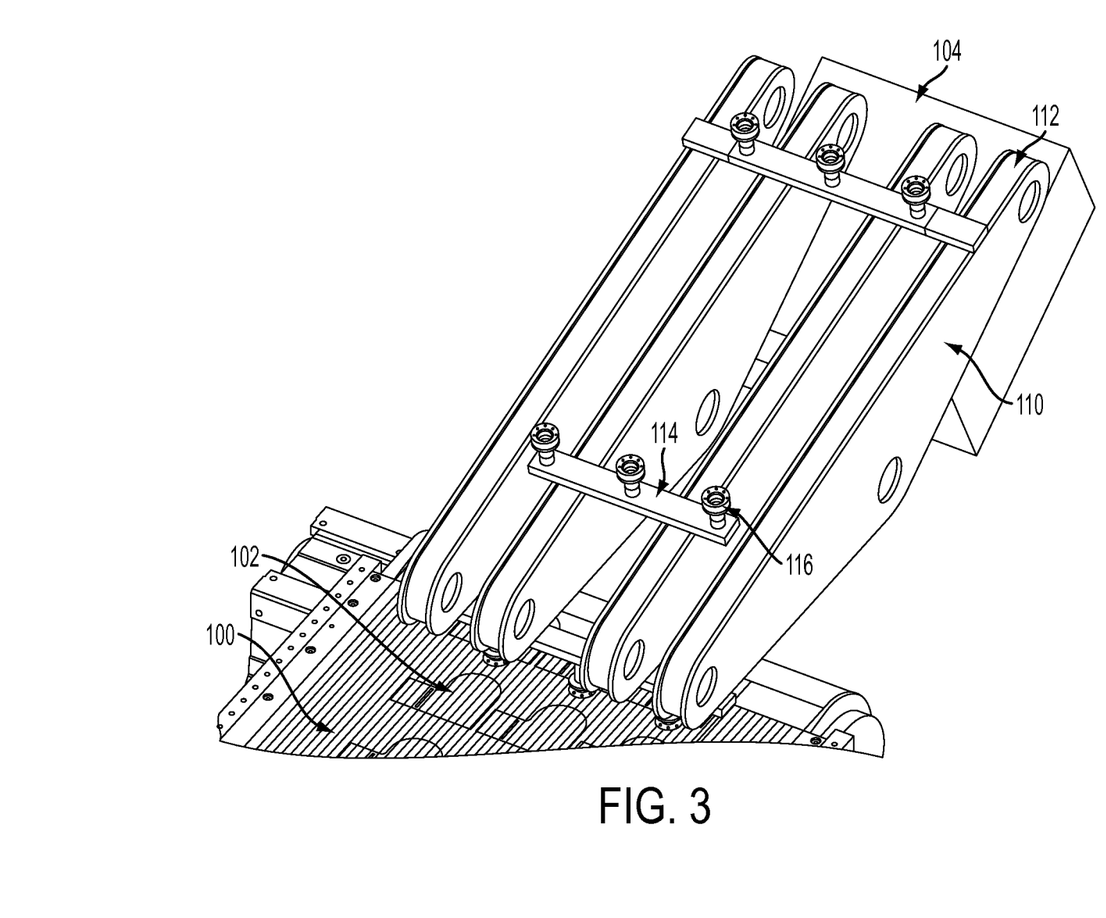
FIG. 3 is a perspective-view schematic diagram of a device according to embodiments herein.
Figure 5:
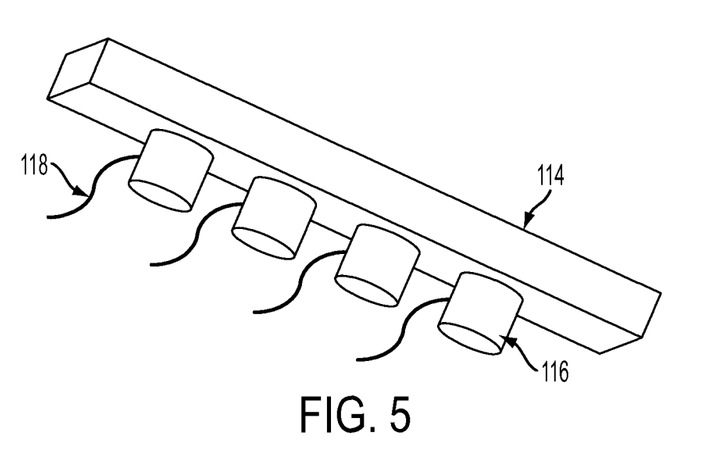
FIG. 5 is a perspective-view schematic diagram of a device according to embodiments herein.
Figure 6:
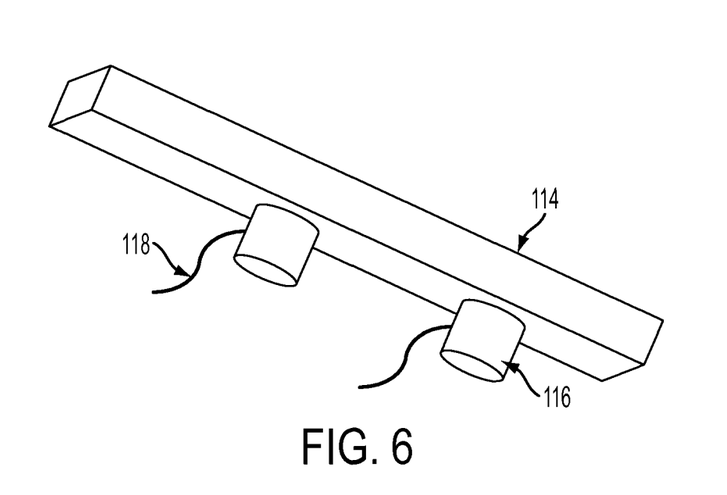
FIG. 6 is a side-view schematic diagram of a device according to embodiments herein.

In the examples shown in FIGS. 1 and 3, each bar 114 includes three suction cups 116 for handling the three lanes of workpieces 102 from the belt 100. FIGS. 1 and 3 illustrate the picker bars 114 having a number of suction cups 116. FIGS. 5 and 6 relatively illustrate more and less numbers of suction cups 116 on different bars 114 and vacuum lines 118 that provide a suction force to the suction cups 116. The vacuum lines 118 are only illustrated in FIGS. 5-6 to avoid clutter in the other drawings, but as would be understood by those ordinarily skilled in the art such elements could be included in the other structures. Suction cup systems, belts, etc., are well-known individual structures and are not discussed herein in detail. For a detailed discussion of such structures see U.S. Pat. No. 3,966,318 (the complete disclosure of which is incorporated herein by reference).

As would be understood by those ordinarily skilled in the art, any number of suction cups can be used with the bars 114, depending upon the specific application. In addition, in some embodiments, different bars 114 can include different numbers of suction cups 116 to provide additional flexibility in the picking operation.

Vacuum is applied to the suction cups 116 to remove the workpieces 102 from the belt 100. The vacuum cups 116 can be either static or dynamic to allow for multiple heights during the picking and placing processes. After the suction cups 116 pick up the workpieces 102, the belts 112 independently move the picker bars 114 to transport the workpieces. The vacuum is then discontinued to deposit the workpieces 102 onto a nearby stacking area 104. This stacks the workpieces 102 in stacking area 104, until the workpieces 102 are moved (by the stacking area 104) to downstream packaging or finishing operations. The picker bars 114 can alternatively deliver larger signage to another conveyor belt, instead of a stacking area 104.

Figure 2:
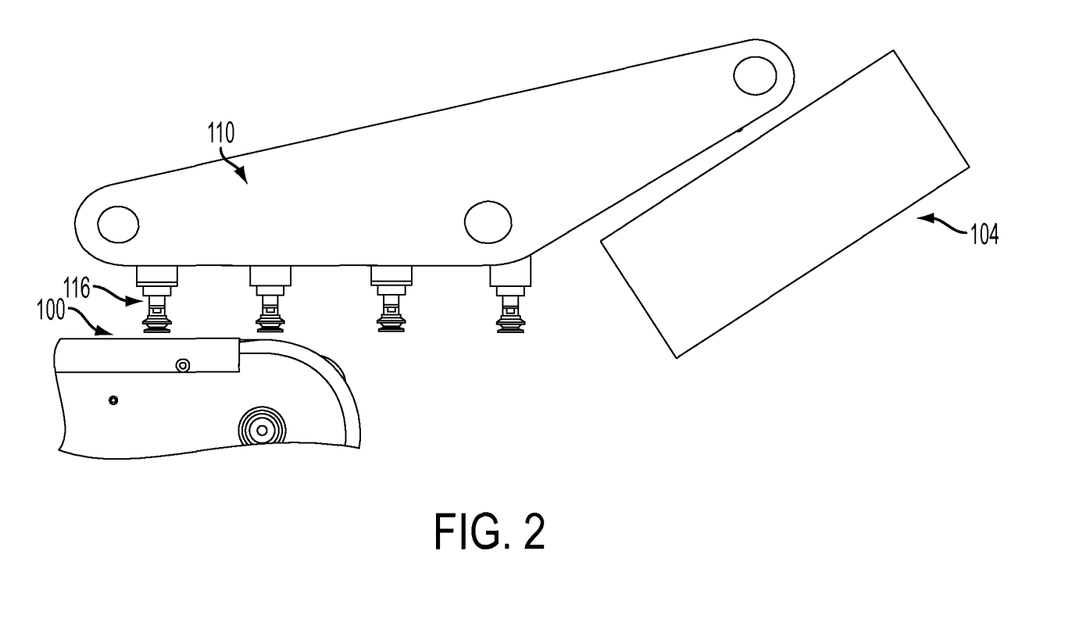
FIG. 2 is a side-view schematic diagram of a device according to embodiments herein.

In the specific example shown in FIGS. 1-2, four independent drive belts 112 are illustrated, and each belt 112 is connected to one of four picker bars 114 (picker support elements). As illustrated in FIGS. 1 and 2, each of the picker bars 114 is attached to only a single belt 112 (in a cantilevered manner). While four belts 112 and picker bars 114 are used in this example, those ordinarily skilled in the art would understand that less belts/bars or more belts/bars could be used, depending upon the specific implementation. Additionally, multiple bars 114 could be connected to each of the belts 112; however, each bar 114 can be connected to only a single belt, since the belts 112 can move at different speeds.

Figure 4:
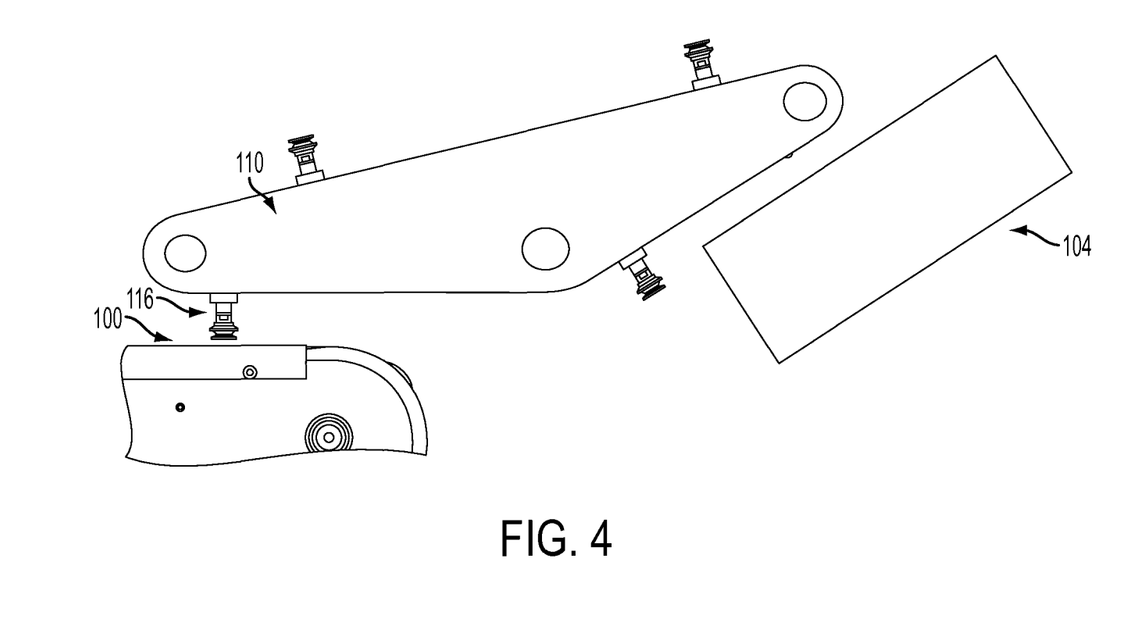
FIG. 4 is a perspective-view schematic diagram of a device according to embodiments herein.

Unlike the cantilevered design illustrated in FIGS. 1 and 2, in FIGS. 3 and 4, each end of each picker bar 114 is connected to at least two belts 112. Thus, in FIGS. 1 and 2 each picker bar 114 is connected to a single belt, while in FIGS. 3 and 4 each picker bar 114 is connected to two (or more) belts 112. Thus, in FIGS. 3 and 4, one picker bar is connected to the middle 2 belts and the next is connected to the outer 2 belts. This alternation continues for the rest of the bars in FIGS. 3 and 4. In FIGS. 3 and 4 the picker bars 114 have different lengths, to allow the picker bars 114 to connect to the appropriate belts; however, the suction cups 116 can still be identically spaced on all picker bars 114, despite the different sizes of the picker bars 114.

A processor/controller (discussed in greater detail below) independently controls each of the drive belts 112. Therefore, the drive belts 112 can be moved at different speeds relative to each other. This allows the picker bars 114 to be moved independently of one another to accommodate different operating speeds of the processing belt 100 and the stacker unit 104. Therefore, for example, the picker bars 114 could move at one speed when removing the workpieces 102 from the production belt 100, and the picker bars 114 could move at a different speed when depositing the workpieces 102 in the stacker unit 104.

Thus, one (or more) of the belts 112 could be moving one (or more) of the bars 114 at one speed while, at the same time (simultaneously) a different belt (or pair of belts) 112 could be moving a different bar (or bars) 114 at a different speed (making the bars speeds independent of one another). Further, the belts 112 can move the picker bars 114 at a different speed than the processing belt 100 moves, to enable the picker bars greater variability for picking the workpieces from the processing belt 100 and placing the workpieces in the stacker unit 104. The bars 114 do not pass one another and stay in the same sequential order; however, at different locations of their rotational path, the movement speed of the bars 114 can be adjusted by changing the speed of the corresponding belt 112.

Further, this change in speed can be performed in real time continuously and dynamically to accommodate for different (and potentially dynamically changing) conditions occurring on the processing belt 100 and the stacker unit 104. The controller regularly receives a series of different jobs, one after the other. Each of the jobs contains different job-specific instructions that define cuts to be made by the laser cutter, that could be different for each job. The different job-specific instructions also define a pattern of workpieces that will be output to the transport surface (that could also be different for each job). Thus, the controller independently and automatically controls movement of the belts and actuation of the picking elements to dynamically position and actuate the picking elements in coordination with each different job-specific pattern of the workpieces 102 output to the transport surface 100, without pausing between jobs.

In other words, according to the requirements of each job, the processor changes the action of the cutter to output different patterns of workpieces corresponding to each different job, and simultaneously changes the movement of the belts 112 and the actuation of the suction cups 116 to match the pattern of the workpieces currently being output to the transport belt 100. To the contrary, conventional systems require a manual reconfiguration of the picking device between jobs that will change the pattern of workpieces output to the transport belt 100. Therefore, these rotary motion, high speed pick and place devices utilize independent drives and picker bars to enable acceleration or deceleration before and after picking or placing the workpiece 102. Further, such processing does not impact workpiece placement.

In the examples illustrated in FIGS. 1-4, each of the picker bars 114 includes three suction cups 116 (although those ordinarily skilled in the art would understand that each of the picker bars 114 could include more or less suction cups, including a variable number of cups). Therefore, these examples illustrate three linked "lanes" on a tracking system, in which each belt may carry one picker bar or pairs of belts may be used to carry one picker bar, as shown above. Each belt or pairs of belts can carry one or more suction "picker" bars 114 which align with the workpieces 102 to acquire them from the laser belt 100 immediately after they are cut.

Although three lanes are shown here, the concept is not to be limited to only three and a greater number (or a smaller number) of picker bars could be utilized. Further, such rotary (continuous) belts can be configured to provide alternate paths, including multiple positional placements of the workpieces, utilizing different diameter paths, different shaped paths (ovals, etc.). Those ordinarily skilled in the art would understand that many variations are possible. For example, a non-sloping transport could be utilized, and a single picker bar can be utilized (for dynamic inboard/outboard control) to create a single stack of workpieces, instead of the three stacks created by the three picker bars discussed above.

In addition, while the drawings illustrate that each of the picker bars 114 includes the same number of suction cups 116, in other embodiments (shown in FIGS. 5-6) different picker bars 114 can include different numbers of suction cups 116. Therefore, certain picker bars can be selectively used to process three lanes of workpieces 102, while other picker bars 114 can be used to process two lanes, four lanes, etc., of workpieces 102, allowing a mixture of different numbers of lanes to be picked. Whether one lane, two lanes, three lanes, four lanes, etc., are processed is dynamically controlled by the processor/controller (through different movement of the different belts 112, and different actuation of different suction cups 116) to dynamically accommodate any pattern of lanes of workpieces 102 that may be dynamically produced onto the production belt 100. Thus, in one embodiment, each belt can be connected to two picker bars, one of which has three suction cups and the other of which has four suction cups. The belts 112 can be rotated (and the suction cups 116 selectively activated) to have the picker bars with three suction cups process three lanes of workpieces 102 during one processing run. Then, subsequently, during another processing run, the other picker bars (with four suction cups) can be activated and selectively positioned over the production belts 100 to dynamically process four lanes of workpieces 102, without having to physically alter the system in any way whatsoever.

The alignment of the picker bars 114 to the workpieces 102 in the process direction is accomplished by timing the suction cup 116 (picker head) velocity profile to sync with the known locations of the approaching workpieces 102 on the laser belt 100, as controlled by the controller. In one example, machine readable markings, such as bar codes on each sheet of workpieces produced can identify to the processor all necessary workpiece cutting, speed, and positional information. Alternatively, input sheets used to create the workpieces 102 can similarly contain such machine readable markings, or the cutting/positional location information of the workpieces 102 can be transferred to the processor/controller through any network connection (or can be provided by user input through, for example, a graphic user interface).

For example, preprinted sheets of signs (containing machine readable markings, such as barcodes) that need to be laser cut into individual signs can be supplied to the processor/controller to control a laser cutting machine which cuts the preprinted sheets according to the predetermined pattern required by the barcodes to produce individual signs (workpieces) 102 that are placed on the production belt 100. The machine readable markings are also utilized by the processor/controller to know what the pattern of workpieces will be on the production belt 100. Given this, the processor/controller can control the speed of the different belts 112 (based on such barcode information, for example) and the activation/deactivation of the vacuum supplied to the suction cups 116 (along with the speed of the belts 112) to adjust the position and speed of the suction cups 116 to match that of the workpieces 102 on the belt 100. Such adjustments can be made automatically (without additional user intervention/adjustment) and dynamically for each different sheet that is to be laser cut, such that virtually any pattern of laser cutting can be automatically accommodated by the picking systems described in this embodiment for each different sheet that is laser cut.

In addition, the three suction cup structure shown in FIGS. 1 and 3, the systems herein can also handle one, two, or three lanes of workpieces 102 "on the fly" as required by selectively valving the pickers as needed to pick lanes only where cut workpieces 102 exist (to avoid picking the unwanted scrim (scrap)) which generally falls off the end of the belt 100 if it is not picked by one of the suction cups 116. The suction cups 116 need not be re-positioned to account for the number of lanes that the workpieces 102 will appear in different future jobs. The suction cups 116 are also made to be manually or automatically adjustable along the length of the bars 114 to account for any type of lane spacing.

The system may also be replicated to include more than one variable drive system to work cooperatively, but independently, to enable higher workpiece pick frequency and independently controlled pick and place operations. Thus, this system includes any combination of independent drives coupled with one or more picker bars 114 to provide the required pick frequency and independence of pick and place for most any application.

This system can process workpieces, including signage, custom packaging applications, etc. For larger signage or sheets, the picker belt path can overlap an optional conveyor to enable the transfer of larger workpieces 102 or sheets from the laser belt 100. After the picker bars 114 acquire either one, two, three, or more lanes of workpieces 102, they then deposit the workpieces 102 onto the stacking area 104.

Therefore, the system presented herein can dynamically process different jobs that may be produced onto the belt 100, wherein the different jobs may produce workpieces 102 in various numbers of lanes, may space the workpieces 102 dynamically on the production belt 100, may cause the belts 112 to move at different speeds, etc. Further, the embodiments herein can account for different operational speeds of the processing belts 112 and the stacking area 104.

Thus, the systems described herein enable picker bars 114 to provide almost any pick frequency and independent "pick and place" operations for flexible high speed signage (or other application) printing. The custom picker bars 114 are designed to pick up different numbers of lanes of workpieces 102 while providing independent valving capability to avoid undesired pick of scrim (waste).

The systems described herein enable maximum flexibility of production printing system for cut media by removing the barrier of limited size and shape picking and stacking capability while maintaining a high level of process automation and finishing flexibility. This brings the picking system up to the level of flexibility of the rest of modern printing and cutting system. The embodiments herein allow for independent picking and independent placement of cut media and allow for motion profile flexibility due to independence of pick and place for multiple drives system option. The systems herein are expandable/flexible systems and can be easily modified by adding or removing any number of picker bars 114. Further, these systems allow the customer to increase translation distance from the belt with limited hardware impact, while maintaining pick and place capabilities. Also, these embodiments provide a queuing capability that allows the picker bars 114 to pick at high frequency based on variable data provided for individual sheets. This applies to multiple drive systems also.

Thus, as shown by the previous specific embodiments, this disclosure presents a vastly improved automation system that allows dynamic processing without requiring the user to perform extensive set up operations for each different type of sign or workpiece that is processed. Conventional systems require the user to perform "setup" operations whenever the size, shape, pattern, etc., of the workpiece being produced changes or when the rate at which workpieces are produced changes. To the contrary, the structures and methods provided in this disclosure process many varied jobs (such as the printing and laser cutting of signs) without having to perform any set up operations (except, potentially the loading of different types of media). Therefore, the production of many different jobs can be performed continuously and automatically, without interruption, on the same unaltered manufacturing devices.

As explained above, the production devices herein can continuously receive different jobs and the processors utilized cause the production devices (such as the laser cutting device) to output workpieces on to the transport belt in different shapes, sizes, spacings, and at different rates depending upon the requirements of each individual job. The embodiments herein utilize the various picking devices described above to automatically and dynamically change the way in which the workpieces are removed from the transport belt and the way the workpieces are supplied to the stacking areas (again under control of one or more processors). This eliminates the need to setup the picking devices for the different output requirements of each different job (and the potentially different receiving requirements of each stacking area). To the contrary, when a different job is started in conventional systems, they require that production be stopped, the picking units be set up for the new output that is to be received, and then the new job can be processed.

Because the disclosed devices and methods automatically dynamically adjust to the different sized and shaped workpieces, the different pattern of workpieces on the transport belt, the different speeds of the transport belt, etc., and automatically coordinate the picking process with the potentially constantly changing loading requirements of the stacker, the embodiments herein provide dramatically increased productivity and reduced user frustration (which can often occur during the sometimes elaborate setup procedures). This disclosure therefore presents systems and methods that can automatically process different job after different job, continuously and without interruption, to provide the user with unparalleled capabilities, benefits, and satisfaction.

Figure 7:
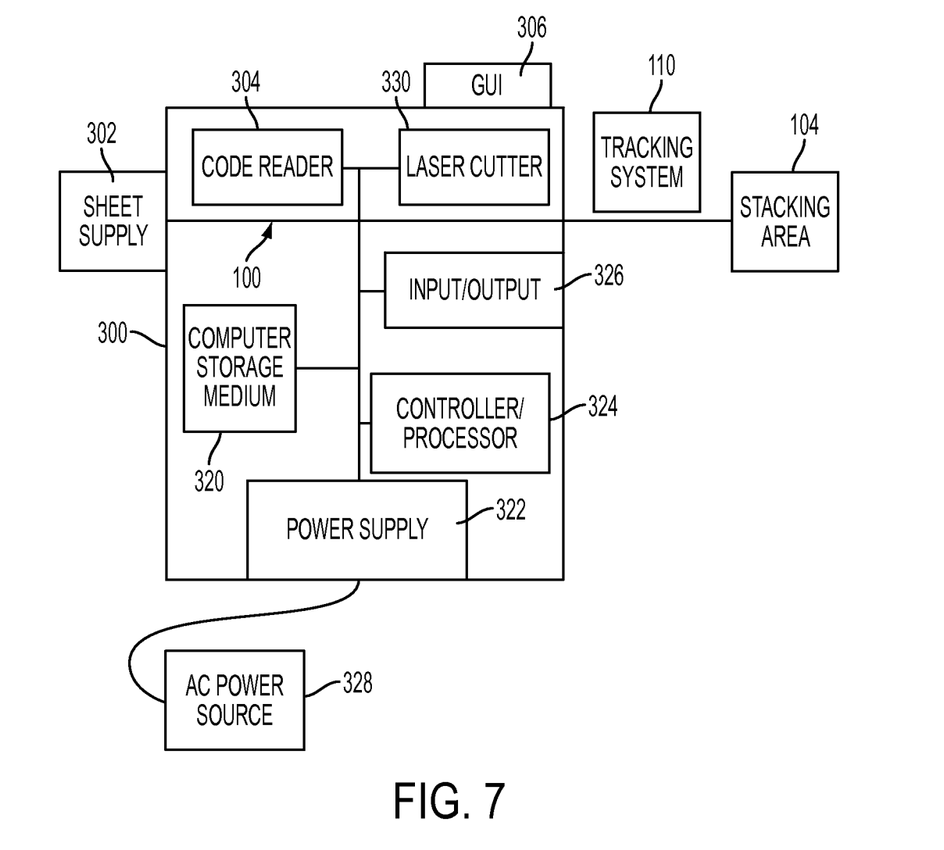
FIG. 7 is a side-view schematic diagram of a device according to embodiments herein.

FIG. 7 illustrates a computerized device 300, which can be used with embodiments herein and can comprise, for example, a laser cutting machine, etc. The device 300 includes a controller/processor 324, a media path 316 positioned to supply sheets of media from a sheet supply 302 to be processed, and a communications port (input/output) 326 operatively connected to the processor 324 and to a computerized network external to the printing device. A power supply 322 is connected to a power source 328 and supplies power to the various components of the device 300.

Also, the printing device 300 can include at least one accessory functional component such as a graphic user interface assembly 306 and a computer-readable code reader 304 (e.g., bar code scanner) that also operate on the power supplied from the external power source 328 (through the power supply 322). The input/output device 326 is used for communications to and from the device 300. The processor 324 controls the various actions of the device. A non-transitory computer storage medium device 320 (which can be optical, magnetic, capacitor based, etc.) is readable by the processor 324 and stores instructions that the processor 324 executes to allow the multi-function printing device to perform its various functions, such as those described herein.

A laser cutter 330 (or other form a cutter, such as a knife, stamping machine, etc.) cuts the sheets from the sheet supply 302 into workpieces 102 and leaves the workpieces 102 in a pattern on the transport belt 100 (transport surface). After being cut, the workpieces 102 are picked by tracking system 110 discussed above, which stacks the workpieces in the stacking area 104. As mentioned above, the controller 324 independently and automatically controls movement of the belts 112 and actuation of the picking elements 114 to dynamically position and actuate the picking elements 114 in coordination with each different job-specific pattern of the workpieces 102 output to the transport surface 100, without pausing between jobs. As would be understood by those ordinarily skilled in the art, the device 300 shown in FIG. 7 is only one example and the embodiments herein are equally applicable to other types of printing devices that may include fewer components or more components.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A system comprising:
   parallel belts positioned adjacent a transport surface, said belts moving in a process direction, said transport surface moving workpieces in said process direction in lanes on said transport surface;
   picker support elements connected to said belts;
   picking elements connected to said picker support elements, at least two of said picking elements being connected to each of said picker support elements, said picking elements having physical picking features that remove said workpieces from said transport surface and move said workpieces to another location as said belts move, said picker support elements being cantilevered from said belts in a direction perpendicular to said process direction across said lanes of said transport surface, each of said picker support elements being connected to said belts so as to align different picking elements of a given picker support element with different ones of said lanes on said transport surface; and
   a controller operatively connected to said picker support elements and said picking elements,
   said controller independently and automatically controlling speeds of said belts and actuation of said picking elements to operate said belts at different speeds and change a relative spacing of said picker support elements and actuate different ones of said picking elements differently to match each different job-specific pattern of said workpieces in said lanes on said transport surface.

2. The system according to claim 1, said picker support elements comprising independently movable bars each comprising multiple ones of said picking elements, and said picking elements comprising suction devices connected to said bars.

3. The system according to claim 1, said picking elements moving said workpieces from said transport surface to a stacking area.

4. The system according to claim 1, further comprising a production machine producing said workpieces, said production machine being operatively connected to said controller and providing said controller with dynamic size, spacing, and transport speed of said workpieces.

5. A system comprising:
   parallel belts positioned adjacent a transport surface, said belts moving in a process direction, said transport surface moving workpieces in said process direction in lanes on said transport surface;
   bars connected to said belts, each of said bars being connected to a single one of said belts;
   picking elements connected to said bars, at least two of said picking elements being connected to each of said bars, said picking elements having physical picking features that remove said workpieces from said transport surface and move said workpieces to another location as said belts move, said bars being cantilevered from said belts in a direction perpendicular to said process direction across said lanes of said transport surface, each of said bars being connected to said belts so as to align different picking elements of a given picker support element with different ones of said lanes on said transport surface; and
   a controller operatively connected to said bars and said picking elements,
   said controller independently and automatically controlling speeds of said belts and actuation of said picking elements to operate said belts at different speeds and change a relative spacing of said bars and actuate different ones of said picking elements differently to match each different job-specific pattern of said workpieces in said lanes on said transport surface.

6. The system according to claim 5, said belts being operatively connected to said controller, and said belts moving said bars as controlled by said controller.

7. The system according to claim 5, said picking elements moving said workpieces from said transport surface to a stacking area.

8. The system according to claim 5, said picking elements comprising suction devices connected to said bars.

9. The system according to claim 5, further comprising a production machine producing said workpieces, said production machine being operatively connected to said controller and providing said controller with dynamic size, spacing, and transport speed of said workpieces.

10. A system comprising:
    parallel belts positioned adjacent a transport surface, said belts moving in a process direction, said transport surface moving workpieces in said process direction in lanes on said transport surface, said belts being independently movable relative to each other;
    bars connected to said belts, each of said belts being connected to at least one of said bars and each of said bars being connected to only one of said belts, independent movement of said belts causing independent movement of said bars relative to each other;
    picking elements connected to each of said bars, said picking elements having physical picking features that remove said workpieces from said transport surface and move said workpieces to another location as said belts move, said bars being cantilevered from said belts in a direction perpendicular to said process direction across said lanes of said transport surface, each of said bars being connected to said belts so as to align different picking elements of a given picker support element with different ones of said lanes on said transport surface, each of said bars comprising multiple ones of said picking elements; and
    a controller operatively connected to said belts and said picking elements,
    said controller independently and automatically controlling speeds of said belts and actuation of said picking elements to operate said belts at different speeds and change a relative spacing of said bars and actuate different ones of said picking elements differently to match each different job-specific pattern of said workpieces in said lanes on said transport surface.

11. The system according to claim 10, said belts being operatively connected to said controller, and said belts moving said bars as controlled by said controller.

12. The system according to claim 10, said picking elements moving said workpieces from said transport surface to a stacking area.

13. The system according to claim 10, said picking elements comprising suction devices connected to said bars.

14. The system according to claim 10, further comprising a production machine producing said workpieces, said production machine being operatively connected to said controller and providing said controller with dynamic size, spacing, and transport speed of said workpieces.

15. A system comprising:
    parallel belts positioned adjacent a transport surface, said belts moving in a process direction, said transport surface moving workpieces in said process direction in lanes on said transport surface;
    bars connected to said belts, each of said bars being connected to two of said belts;
    picking elements connected to said bars, at least two of said picking elements being connected to each of said bars, said picking elements having physical picking features that remove said workpieces from said transport surface and move said workpieces to another location as said belts move, said bars being cantilevered from said belts in a direction perpendicular to said process direction across said lanes of said transport surface, each of said bars being connected to said belts so as to align different picking elements of a given picker support element with different ones of said lanes on said transport surface; and
    a controller operatively connected to said bars and said picking elements,
    said controller independently and automatically controlling speeds of said belts and actuation of said picking elements to operate said belts at different speeds and change a relative spacing of said bars and actuate different ones of said picking elements differently to match each different job-specific pattern of said workpieces in said lanes on said transport surface.

16. The system according to claim 15, said belts being operatively connected to said controller, and said belts moving said bars as controlled by said controller.

17. The system according to claim 15, said picking elements moving said workpieces from said transport surface to a stacking area.

18. The system according to claim 15, said picking elements comprising suction devices connected to said bars.

19. The system according to claim 15, further comprising a production machine producing said workpieces, said production machine being operatively connected to said controller and providing said controller with dynamic size, spacing, and transport speed of said workpieces.

* * * * *